Sept. 27, 1938.  W. F. GROENE ET AL  2,131,698
CRANKSHAFT CHUCK
Filed Oct. 18, 1937
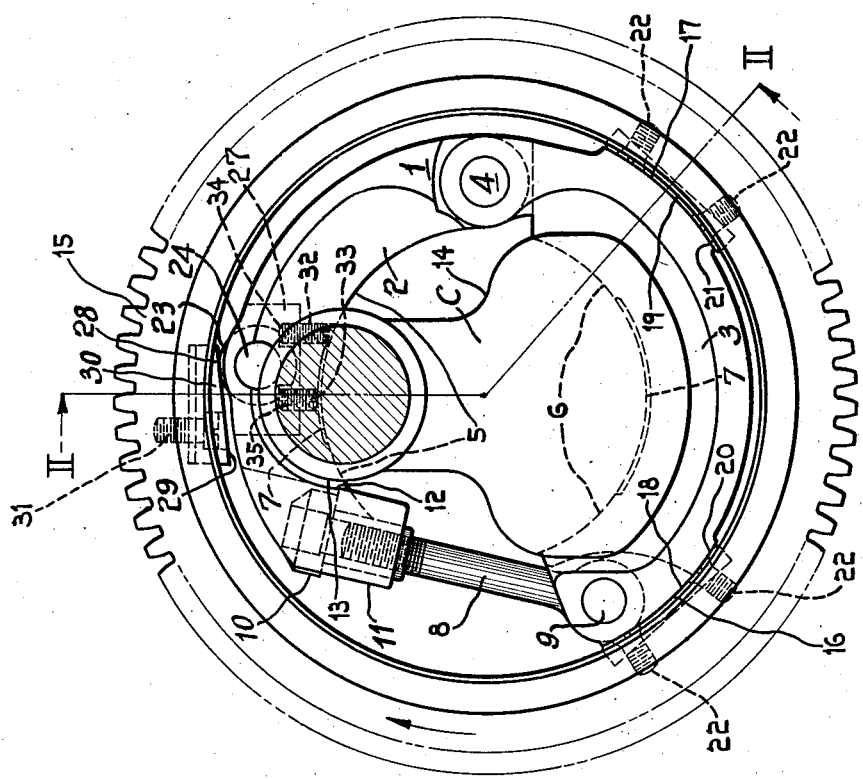
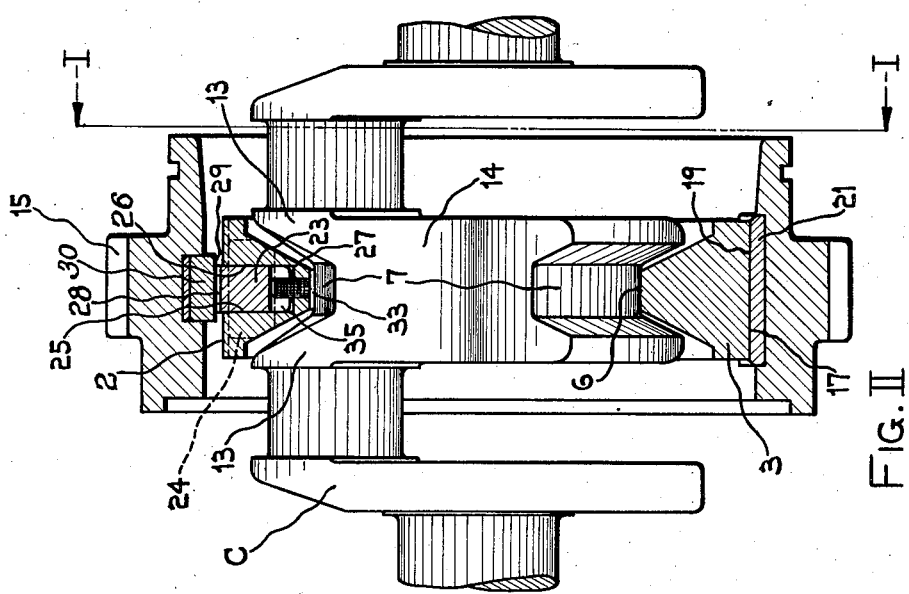
INVENTORS.
WILLIAM F. GROENE
WALTER R. MEYER
BY
ATTORNEY.

Patented Sept. 27, 1938

2,131,698

UNITED STATES PATENT OFFICE 2,131,698

CRANKSHAFT CHUCK

William F. Groene and Walter R. Meyer, Cincinnati, Ohio, assignors to The R. K. Le Blond Machine Tool Company, Cincinnati, Ohio, a corporation of Delaware Application October 18, 1937, Serial No. 169,549

8 Claims. (Cl. 82—40)

This invention pertains to certain modifications and improvements in chucking devices of a character shown in our copending application Serial Number 121,509, filed January 21, 1937. More specifically the invention pertains to improvements in applying the chucking ring to the premachined peripheral locating area of the crankshaft preparatory to loading the assembly in the center drive ring gear.

An object of our invention is to provide in a chuck which utilizes a chucking ring engaging around a peripheral locating area of a work piece, an arrangement for positively locking the chucking ring about the work piece before said assembly is inserted in the work spindle.

Another object is to arrange a chuck, which utilizes a chucking ring engaging around a peripheral locating area of a work piece, in such a way that the chucking ring is at all times maintained in proper engagement with the work independent of any driving action of the work spindle on the chucking ring.

Further objects will appear in the course of the following description of the drawing in which:

Figure I is an axial view partly in section on line I of Fig. II of a ring gear chucking arrangement utilizing a machined peripheral locating area on a crankshaft web, clearly showing the chucking ring applied to the crankshaft.

Figure II is a view partly in section on line II—II of Figure I clearly showing points of contact between the crankshaft, the chucking ring, and the driving gear.

The arrangement comprises a chucking ring I comprising the arcuate members 2 and 3 hinged together about a pivot pin 4. The member 2 has a bearing surface 5 and the member 3 has a bearing surface 6 adapted to nicely fit around the peripheral locating surface 7 of the crankshaft C, when the two members 2 and 3 are swung together about the work. After the members are so engaged with the surface 7 an eyebolt 8 pivotally mounted on a pin 9 fixed in the member 3 is swung toward the work C, its upper end having a tightening nut 10 which enters the slotted end 11 of member 2 and is tightened down to firmly bind the two members 2 and 3 on the peripheral locating surface. The chucking ring I can positively drive the crankshaft clockwise as shown in Fig. I by abutting contact of the surface 12 of the member 2 with surface 13 of the crankshaft web 14 having the peripheral locating area 7.

After having thus properly applied the chucking ring I to the crankshaft C, the crankshaft is inserted axially into the driving spindle or ring gear 15 while held in a position turned slightly in a clockwise direction from the position shown in Fig. I. The finished convex surface 16 and 17 on the outside of the chucking ring member 3 contacts the respective mating surfaces 18 and 19 formed by the respective concave plates 20 and 21 fixed to the ring gear 15 by suitable screws 22 to properly center the chucking ring I and thus the crankshaft C on its proper center of turning.

Substantially diametrically opposite the surfaces 16 and 17 of the chucking ring member 3 is mounted a roller 23 on a stud 24 fixed in member 2 and confined from axial movement on the stud 24 by the side walls 25 and 26 of the pocket 27. The roller 23 has a flatted portion 28 adapted to engage the angularly disposed surface 29 of the driving wedge 30 fixed in the ring gear 15 by a screw 31. Set screws 32 and 33 threaded in the member 2 project into the pocket 27 and engage into notches 34 and 35 respectively are adapted to be adjusted to permit only sufficient rotation of the roller 23 to allow proper engagement of the flatted portion 28 thereof with the surface 29 of driving wedge 30 while at the same time keeping the roller properly positioned for said engagement when the ring I is removed from the ring gear 15 during loading and unloading of the work.

After having axially loaded the crankshaft C with the chucking ring I applied thereto as described, the crankshaft and chucking ring are rotated counter-clockwise, as shown in Fig. I, on the bearing portions 18 and 19 either by manual rotation of the crankshaft or by starting rotation of the driving ring gear 15 in a clockwise direction or normal driving direction, whereupon the flatted portion 28 of the roller 23 is brought into engagement with the angularly disposed surface 29 of the driving wedge 30 to thereby cause the ring gear 15 to drive the chucking ring I and the crankshaft C in clockwise direction. The engagement of the driving wedge 28 with roller 23 causes the driving ring with its crankshaft web gripped in it to be urged radially toward the surfaces 18 and 19 in the ring gear to assure accurate, positive maintenance of centered position during rotation of the crankshaft.

It is to be noted in this arrangement that the chucking ring is fully engaged and clamped up tight about the peripheral locating area 7 before the work with the ring attached is inserted in the driving spindle 15. By this arrangement the maintenance of proper engagement of the chucking ring and the work piece is completely divorced from the driving action of the ring gear 15 on the chucking ring 1.

Having fully set forth and described our invention, what we claim is:

1. A chucking device for crankshafts comprising, a rotatable work spindle, a chucking ring applicable to a finished locating area on a crankshaft, abutment means on said spindle adapted to engage said chucking ring whereby said chucking ring is driven in properly located position on said spindle, and means on said chucking ring to maintain said crankshaft properly gripped in said chucking ring independent of the driving action of said spindle.

2. A chucking device for crankshafts comprising a rotatable work spindle, a chucking ring applicable to a finished locating area on a crankshaft, abutment means on said spindle adapted to engage said chucking ring whereby said chucking ring is driven in properly located position on said spindle, means on said chucking ring to maintain said crankshaft properly engaged and located in said chucking ring, and means on said chucking ring engaging an unmachined portion of said crankshaft to positively drive said crankshaft.

3. In a chucking device for crankshafts, a chucking ring comprising a pair of semi-circular members hinged together at one of their ends, concave surfaces on said members adapted to be engaged with peripheral locating surfaces on a crankshaft when swung toward each other, means on said members for holding said members engaged with said crankshaft, convex surfaces on said chucking ring adapted to engage mating concave surfaces on a rotatable work spindle, and means on said work spindle to drive said chucking ring and to maintain proper engagement of the surfaces of said chucking ring and said work spindle.

4. In a chucking device for crankshafts, a chucking ring comprising a pair of semi-circular clamping members, means on said member for holding them in firm engagement with premachined locating areas on a crankshaft web, means on at least one of said members adapted to engage locating surfaces on a rotatable work spindle for accurately centering said chucking ring and said crankshaft on said work spindle, some of said locating surfaces on said work spindle serving also to cause said work spindle to drive said chucking ring, and means on said chucking ring for positively driving said crankshaft.

5. In a chucking device for crankshafts, a chucking ring comprising a pair of hinged clamping members, means on said members for holding them in firm engagement with premachined locating areas on a crankshaft web, means on at least one of said members adapted to engage locating surfaces on a rotatable work spindle for accurately centering said chucking ring and said crankshaft on said work spindle, some of said locating surfaces on said work spindle serving also to cause said work spindle to drive said chucking ring, and means on said chucking ring for positively driving said crankshaft.

6. In a chucking device for crankshafts, a chucking ring comprising clamping members, means on said members for holding them in firm engagement with premachined peripheral locating areas on a crankshaft web, means on at least one of said members adapted to engage arcuate locating surfaces on a rotatable work spindle for accurately centering said chucking ring and said crankshaft on said work spindle, some of said locating surfaces on said work spindle serving also to cause said work spindle to drive said chucking ring, and means on said chucking ring for positively driving said crankshaft.

7. In a chucking device for crankshafts, a chucking ring comprising a pair of clamping members, means on said members for holding them in firm engagement with premachined peripheral locating areas on a crankshaft web, means on one of said members adapted to engage arcuate locating surfaces on a rotatable work spindle for accurately centering said chucking ring and said crankshaft on said work spindle, means associated with said other clamping member and said work spindle to force said clamping ring into engagement with said arcuate locating surfaces and to drive said chucking ring when said spindle is rotated, and means on said chucking ring for positively driving said crankshaft.

8. In a chucking device for crankshafts, a chucking ring, means on said chucking ring for clamping said ring to a premachined locating surface on a web of a crankshaft, means on said ring to engage a locating surface on a rotatable work spindle for centering said chucking ring and said crankshaft in said work spindle, and means on said ring to engage a driving abutment on said work spindle whereby said chucking ring is maintained in proper engagement with said locating surface on said spindle when said spindle is rotated.

WILLIAM F. GROENE.
WALTER R. MEYER.